United States Patent

[11] 3,592,218

[72] Inventors Billy Lynn Guy
 240 Shady Lane, Lexington, Ky. 40503;
 Walden Sam Campbell, 1013 Celia Drive,
 Lexington, Ky. 40504
[21] Appl. No. 846,518
[22] Filed July 31, 1969
[45] Patented July 13, 1971

[54] PRESSURE GAUGE
 20 Claims, 5 Drawing Figs.
[52] U.S. Cl. ..................................................... 137/227,
 73/146.8, 116/34, 137/557, 152/429
[51] Int. Cl. ...................................................... F16k 15/20
[50] Field of Search........................................... 137/227;
 73/146.8; 116/34; 152/429

[56] References Cited
 UNITED STATES PATENTS
 1,276,089 8/1918 Loomis........................ 137/227
 1,482,237 1/1924 Lent............................ 137/227

*Primary Examiner*—Harold W. Weakley
*Attorney*—Frank C. Leach, Jr

ABSTRACT: A combined gauge and inflator for a tire includes a support member threaded on the tire stem with a body slidably disposed within the support member and locked in a first position. The body has a passage extending therethrough with a spring-biased piston slidably disposed therein. With the body in the first position, the piston rests against a spring-biased plunger, which opens the valve in the tire stem when the plunger spring is overcome. The plunger spring is overcome either by an air chuck acting on the piston to move the piston against the plunger or when the body is moved from its first position to a second position in which the body engages the plunger. When the body is moved against the plunger, sealing means on the piston seal the body passage so that air pressure in the tire moves the piston relative to the body. A scale on the piston cooperates with a marker on the body to indicate the pressure of the tire.

PATENTED JUL 13 1971
3,592,218
FIG. 2
FIG. 1
FIG. 3
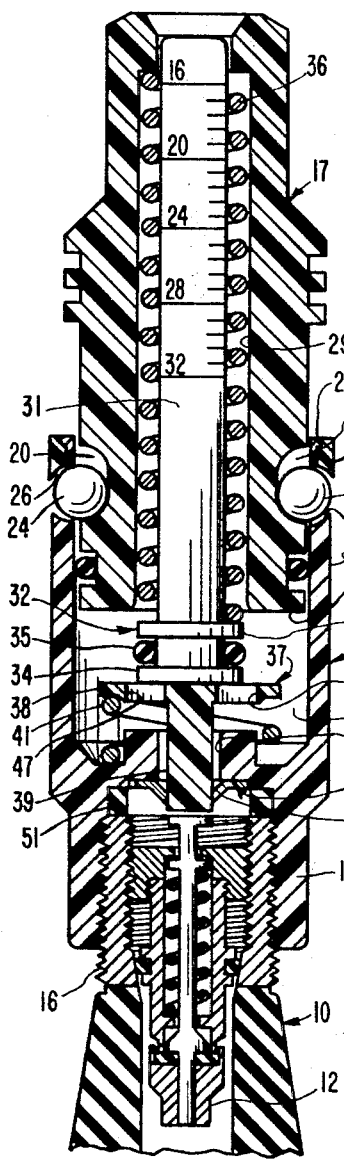
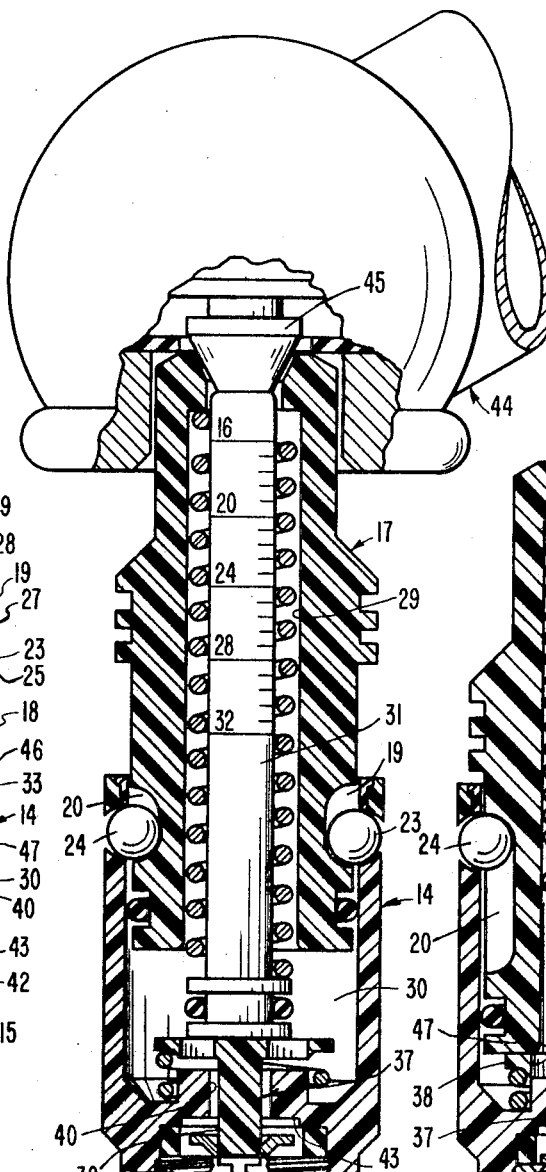
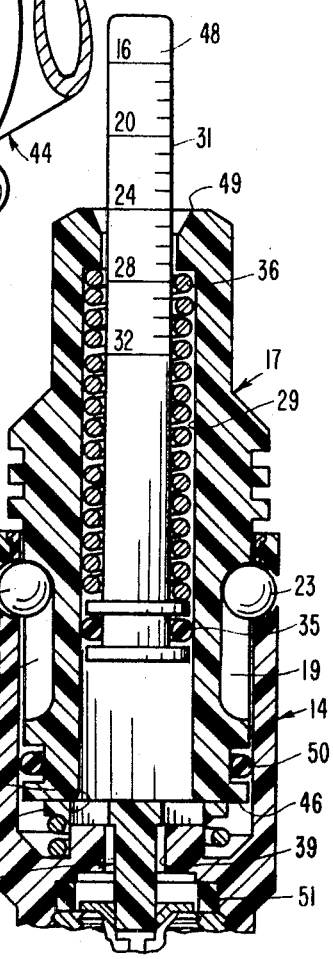
FIG. 4
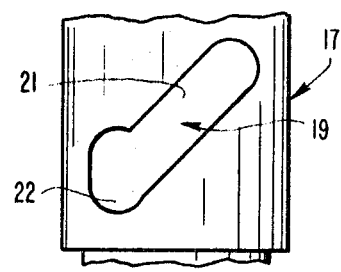
FIG. 5
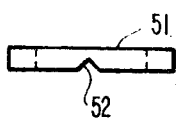
INVENTORS
BILLY LYNN GUY
WALDEN SAM CAMPBELL
BY Frank C. Leach Jr.
ATTORNEY

PRESSURE GAUGE

To obtain a consistent reading of the pressure of 9 tire, tire manufacturers recommend that the pressure of the tire be ascertained when the tire is cool. It is their recommendation that the tire not be run over a mile before the pressure of the tire is determined. Otherwise, the heat generated by the running tire causes the pressure in the tire to increase.

Accordingly, since most motorists do not live sufficiently close to a service station to be able to drive to the service station without the tires becoming heated, most automobile owners are unable to obtain a consistent reading of the pressure in the tires of their automobiles during their visits to the service station. Some motorists seek to alleviate this problem by purchasing a tire pressure gauge with which they check each of the tires. However, this necessitates the gauge being properly positioned on the tire stem to prevent any significant loss of tire pressure. As a result, the users of these gauges may bleed some of the air in the tire during a reading thereof. Furthermore, the gauge can be misplaced or lost.

If a motorist does not own a pressure gauge, the service station attendant is usually requested to check the pressure of the tires. However, the activity at the service station may preclude one from asking the attendant to check the tires with any regularity. As a result, the tires may become underinflated and wear before it is determined that air should be added.

Since many cars are equipped with power steering rather than mechanical steering, it is not as easy to detect underinflated tires Therefore, a motorist cannot rely upon the feel of the tire through the steering but must frequently check the pressure of each of his tires to ascertain whether the tire is properly inflated.

Furthermore, since tire pressure gauges are all not calibrated to the same accuracy and all do not retain their accuracy, the tires may be either overinflated or underinflated after each checking of the pressure of the tires and the addition or removal of air therefrom as a result thereof. Additionally, as previously mentioned, the pressure in the tire varies in accordance with the amount of heat that has been generated in the tire during use before the air pressure of the tire is ascertained.

Thus, if a tire is not properly inflated, full advantage of its intended purpose is not achieved. This is particularly true of the new radial tires.

Additionally, proper inflation of the tire saves its sidewall and results in a longer life. Thus, a properly inflated tire produces more miles of use, particularly when used on freeways at high speeds, and reduces the owner's expense for replacement.

When hitting an object such as a curb, a rock, or the like, a properly inflated tire is not bruised or split as easily as a tire that is not properly inflated. Thus, proper inflation of the tire can prevent accidents as well as damage to the tire.

The present invention satisfactorily overcomes the foregoing problems by providing a tire gauge that may be attached to the tire stem. In the present invention, it is only necessary for the automobile owner to twist a body and slide it slightly relative to a support member to determine the air pressure of the tire. During this movement of the body, the valve in the tire stem is opened to allow the pressure of the air to act on a pressure-responsive member, which has indicating means thereon and is slidably disposed in the body. The amount of air released by the preset invention during reading is very small so that a number of readings of the tire pressure by the gauge of the present invention will not cause any significant amount of air to be bled from the tire. As a result, the tire will not become underinflated due to a number of readings when using the gauge of the present invention.

Furthermore, the tire gauge of the present invention is constructed to permit the tire to be inflated without removal of the tire gauge from the tire stem. Thus, the present invention provides a combined tire pressure gauge and inflator.

By using the combined tire pressure gauge and inflator of the present invention, the user has the convenience of always being able to quickly and accurately ascertain the pressure of a tire. Therefore, by determining that the tire is properly inflated, the safety of the motorist is increased. Additionally, through maintaining the tire at a proper pressure, savings resulting from increased wear of the tire are provided by employing the present invention.

It has previously been suggested to utilize a combined pressure gauge and inflator for a tire. One previously suggested device is that shown in U.S. Pat. No. 1,300,534 to West. However, the aforesaid West patent requires the release of a coupling sleeve from the tire stem before any reading of the pressure of the tire is ascertained. Thus, the present invention provides a much simpler arrangement for ascertaining the pressure of the tire.

In the aforesaid West patent, there is no sealing means between the pressure-responsive element and the member on which it slides. As a result, a true air pressure is not necessarily obtainable when utilizing the gauge of the aforesaid West patent. In the present invention, the pressure-responsive member, which is slidably disposed in a passage in the body that is slidably disposed on the support member, seals the passage to prevent any leakage of the air from the tire when the pressure of the tire is ascertained.

In the aforesaid West patent, it is necessary to employ a cap to close a passage through which air is supplied to the tire when the tire is to be inflated. Since there is no sealing arrangement provided between the cap and the support body, the possibility exists that there may be leakage of the air pressure in this manner when the air pressure of the tire is being ascertained.

As previously mentioned, the sealing means on pressure-responsive member of the present invention insures that there is no leakage through the passage in the body. As a result, it is not necessary to utilize any type of a cap with the combined pressure gauge and inflator of the present invention.

Another combined pressure gauge and tire inflator is shown in U.S. Pat. No. 1,422,256 to Conrad et al. In the aforesaid Conrad et al. patent, it is necessary to employ a check valve in the combined gauge and inflator. Thus, it is necessary to open both this check valve and the valve in the tire stem to inflate the tire. Furthermore, this check valve must be relied upon to seal the passage from the exterior of the body to the tire. The device of the aforesaid Conrad et al. patent also employs an inflator bag as its pressure-responsive member.

The present invention is a much simpler and less expensive device than that of the aforesaid Conrad et al. patent. Thus, the present invention does not require any additional valve structure other than the valve in the tire stem. Furthermore, a simple pressure-responsive member is employed rather than the complicated arrangement of the aforesaid Conrad et al. patent in which an inflator bag is employed.

In the present invention, the valve in the tire stem is never opened except when the tire is to be inflated or when the air pressure of the tire is to be ascertained. When the latter occurs, there is a seal between the pressure-responsive member, which slides in the passage in the body, and the body to effectively prevent leakage of any significant amount of the air from the tire.

The seal is mounted so that it is free at all times except when the pressure of the tire is being ascertained. This prevents wear on the seal and buildup of breakout friction.

An object of this invention is to provide a single device for mounting on a tire that allows the pressure of a tire to be determined and the tire to be inflated.

Another object of this invention is to provide a unique construction for a pressure gauge for ascertaining the air pressure of a tire.

Other objects of this invention will be readily perceived from the following description, claims, and drawing.

This invention relates to a combined tire g0uge and inflator for mounting on a tire including a support member for mounting on a tire stem with a body supported by the support member for movement between first and second positions. The body and the support member cooperate to form a chamber therebetween when the body, which has a passage extending therethrough to provide communication from the exterior of the body to the chamber, is in its first position. The support member supports means, which opens the valve in the tire stem and is urged to an inactive position by suitable means. Means is slidably disposed in the passage in the body and in engagement with the valve opening means when the body is in its first position. The slidably disposed means is responsive to the air pressure in the tire when the body is moved to its second position to move the valve opening means to a valve opening position to open the valve in the tire stem. At least one of the slidably disposed means and the body has sealing means to prevent flow of air through the passage when the body is in its disposed position with the sealing means being ineffective when the body is in its first position. Means indicates the air pressure of the tire in accordance with the position of the slidably disposed means when the body is in its second position. The slidably disposed means is movable by an air chuck or the like to more the valve-opening means to a valve-opening position when the body is in its first position to allow air to be supplied from the air chuck through the body passage to the chamber and from the chamber to the tire.

This invention also relates to a pressure gauge for indicating the fluid pressure in an enclosed chamber in which the gauge includes a support member for connection to the enclosed chamber with a body supported by the support member for movement relative thereto between first and second positions. The support member supports means, which opens a valve that controls communication to the enclosed chamber and is urged to an inactive position by suitable means. The body overcomes the urging means to more the valve-opening means to an active position when the body is moved from its first position to its second position. The body supports means, which is responsive to the pressure of the enclosed chamber when the valve-opening means is in its active position. At least one of the responsive means and the body has means to indicate the pressure of the fluid within the enclosed chamber in accordance with the position of the responsive means in the body.

This invention further relates to a pressure gauge for indicating the fluid pressure in an enclosed chamber in which the gauge includes a support member for connection to the enclosed chamber with a body supported by the support member for movement relative thereto between first and second positions. The body, which has a passage extending therethrough, opens a valve that controls communication to the enclosed chamber when the body is in its second position. Means, which is slidably disposed in the body passage, is responsive to the fluid pressure in the enclosed chamber when the body is in its second position. At least one of the slidably disposed means and the body has means to seal the body passage only when the body is in its second position. The gauge also has means to indicate the fluid pressure in the enclosed chamber in accordance with the position of the slidably disposed means in the body.

The attached drawing illustrates a preferred embodiment of the invention, in which:

FIG. 1 is a vertical sectional view of the combined gauge and inflator of the present invention in its inactive or stow position in which there is neither inflating of the tire nor ascertaining of the tire pressure;

FIG. 2 is a vertical sectional view, similar to FIG. 1, but showing the position of the elements of the combined gauge and inflator when the tire is being inflated;

FIG. 3 is a vertical sectional view, similar to FIG. 1, but showing the position of the elements of the device of the present invention when the pressure of the tire is being ascertained;

FIG. 4 is an elevational view of a portion of the body of the device of the present invention; and FIG. 5 is an elevational view of a seal used with the device of the present invention.

Referring to the drawing and particularly FIG. 1, there is shown a stem 10 of a tire having a valve 12 mounted therein in the well-known manner. When the valve 12 is depressed, communication with the interior of the tire is achieved whereby either air may be bled from the tire or the tire may be inflated.

The combined pressure gauge and inflator of the present invention includes a support member 14 which is supported on the tire stem 10 for disposition in a fixed position. A lower hollow cylindrical portion 15 of the support member 14 has threads on its inner surface for cooperation with threads 16 on the tire stem 10. Thus, when the portion 15 is threaded on the threads 16 of the stem 10 as shown in FIG. 1, the support member 14 is fixed to the tire stem 10.

The support member 14 has a body 17 slidably disposed in its upper hollow cylindrical portion 18. The body 17 has a pair of grooves 19 and 20 in its outer surface and diametrically disposed to each other. As shown in FIG. 4, the groove 19 includes a first straight portion 21 and a second retaining portion 22. The groove 20 is similarly formed.

The groove 19 has a ball 23 disposed therein, and the groove 20 has a ball 24 disposed therein. The ball 23 partially extends through a circular-shaped opening 25 in the hollow cylindrical portion 18 of the member 14 while the ball 24 partially extends through a circular-shaped opening 26 in the hollow cylindrical portion 18 of the support member 14. The openings 25 and 26 are diametrically disposed to each other and are larger than the balls 23 and 24 to allow insertion of the balls 23 and 24 into the grooves 19 and 20.

A retaining ring 27 fits over a bead 28 on the upper end of the support member 14. The retaining ring 27 has its lower surface formed to cooperate with the balls 23 and 24, as shown in FIG. 1, to retain them within the grooves 19 and 20.

When the body 17 is disposed in its inactive or stow position as shown in FIG. 1, the ball 23 is disposed in the retaining portion 22 of the groove 19. Likewise, the ball 24 is disposed in the retaining portion of the groove 20. As a result, the body 17 is locked or held in the position shown in FIG. 1.

The body 17 has a passage 29 extending therethrough to provide communication from the exterior of the body 17 to a chamber 30, which is formed between the body 17 and the support member 14 when the body 17 is in the position of FIG. 1. A rod 31 of a piston 32 is disposed within the passage 29 in sliding relation to the body 17. The rod 31 has a smaller diameter than the passage 29 so as to not interfere with communication between the exterior of the body 17 and the chamber 30.

The piston 32 has a pair of vertically spaced flanges 33 and 34, which have a larger diameter than the rod 31 but a smaller diameter than the passage 29, on the rod 31 to mount a sealing ring 35 therebetween. A coil spring 36 surrounds the rod 31 of the piston 32 and acts against the flange 33 of the piston 32 to urge the piston 32 to the position of FIG. 1 when the body 17 is in the position in which the balls 23 and 24 are in the retaining portions of the grooves 19 and 20, respectively, in the body 17.

When the body 17 is locked in the position of FIG. 1, the flange 34 of the piston 32 engages a plunger 37, which is slidably supported by the support member 14 and adapted to move the valve 12 in the tire stem 10 to an open position. The plunger 37 includes a baseplate 38 and a downwardly projecting portion 39, which extends through a passage 40 in the support member 14 and has its lower end adapted to act against the valve 12 in the tire stem 10.

A coil spring 41 is disposed within the upper hollow cylindrical portion 18 of the support member 14 and acts against the lower surface of the baseplate 38 of the plunger 37 to move it to an inactive position in which the downwardly projecting portion 39 of the plunger 37 cannot engage the valve 12 in the tire stem 10. The upward movement of the plunger 37 by the spring 41 is limited by a nut 42 on the lower end of the projecting portion 39 of the plunger 37 engaging an annular surface 43 of the support member 14.

The force of the spring 41 is stronger than the force of the spring 36 so that the plunger 37 is positioned as shown in FIG. 1 wherein the nut 42 engages the surface 43 of the support member 14. In this position, the flanges 33 and 34 of the piston 32 are disposed in the chamber 30 and exterior of the passage 29 so that the chamber 30 communicates with the exterior of the body 17 through the passage 29.

In this position, the sealing ring 35 is not in engagement with the wall of the passage 29 so that there is no breakout friction buildup on the sealing ring 35 when it is necessary to move the piston 32 relative to the boY 17. This arrangement also permits air to be supplied to the chamber 30 from the exterior of the body 17 from an air chuck 44 or the like.

When the tire 11 is to be inflated, the air chuck 44 is moved into engagement with the upper end of the body 17 so that an actuating portion 45 of the air chuck 44 engages the upper end of the piston rod 31. As a result, pressurized air is supplied from the air chuck 44 to the chamber 30 through the passage 29 between the rod 31 of the piston 32 and the wall of the passage 29.

Since the body 17 is locked to the support member 14 by the balls 23 and 24 being disposed in the retaining portions of the grooves 19 and 20, the body 17 cannot move downwardly when the air chuck 44 contacts it. Therefore, when the actuating portion 45 of the air chuck 44 engages the upper end of the piston rod 31, the plunger 37 is moved downwardly so that the lower end of the downwardly projecting portion 39 engages the upper end of the valve 12 to open it. The pressurized air flows from the chamber 30 and through the passage 40 in the support member 14 and past the valve 12 in the tire stem 10 to inflate the tire. Upon removal of the air chuck 44 from engagement with the piston rod 31, the plunger 37 is moved upwardly by the spring 41 whereby the valve 12 returns to its closed position.

When it is desired to ascertain the pressure of the air within the tire, the body 17 is moved downwardly relative to the support member 14 by twisting the body 17 so that the balls 19 and 20 no longer are retained within the retaining portions of the grooves 23 and 24 in the body 17. Thus, as the body 17 is pushed downwardly, it also rotates relative to the support member 14 because of the angle of the grooves 19 and 20 relative to the axis of the body 17. Therefore, it is necessary to hold the body 17 in the position of FIG. 3 whenever the air pressure in the tire is to be ascertained.

When the body 17 is moved to the position of FIG. 3, the sealing ring 35 of the piston 32 is disposed within the passage 29 of the body 17 to seal the passage 29. As a result, there can be no leakage of air through the passage 29 to the exterior of the body 17.

When the body 17 is moved downwardly from the position of FIG. 1 to the position of FIG. 3, its lower end surface 46 engages the upper surface of the baseplate 38 of the plunger 37 to move the downwardly projecting portion 39 into engagement with the valve 12 in the stem 10. This opens the valve 12 to allow air to flow from the tire through the stem 10, the passage 40 in the support member 14, and openings 47 in the baseplate 38 of the plunger 37 to the passage 29.

As a result, the pressure of the air acts against the sealing ring 35 on the piston 32 to cause the piston 32 to be responsive to this pressure. The air pressure pushes the piston 32 upwardly through the passage 29 against the force of the spring 36 so that a portion of the rod 31 of the piston 32 extends exteriorly of the body 17 as shown in FIG. 3.

The rod 31 of the piston 32 has a scale 48, which has indicia calibrated in pounds per square inch, thereon for cooperation with an edge 49 of the body 17. The edge 49 functions as a marker for cooperation with the indicia on the scale 48 to indicate the pressure in the tire. The spring 36 is selected in accordance with the spacing of the indicia of the scale 48 to oppose the movement of the piston 32 by the pressure in the tire so that the correct reading is obtained by the edge 49 of the body 17 being aligned with one of the indicia on the scale 48.

To insure that the pressure of the tire is applied to the piston 32, the body 17 has a sealing ring 50 thereon for cooperation with the inner wall of the upper hollow cylindrical portion 18 of the support member 14. Furthermore, the support member 14 carries a sealing ring 51 adjacent the threads on the lower hollow cylindrical portion 15 of the support member 14 to form a seal therebetween.

Accordingly, when the body 17 is released by the user and returned to the position of FIG. 1 by the force of the springs 41 and 36 whereby the valve 12 in the tire stem 10 closes, air is trapped between the piston 32 and the closed valve 12. The pressure of this trapped air could be greater than the force of the spring 36 so as to prevent the piston 32 from returning to the position of FIG. 1 in which the sealing ring 35 is not within the passage 29.

Accordingly, to avoid the necessity for the user to push down on the upper end of the rod 31 of the piston 32 to return it to the position of FIG. 1, the sealing ring 51 has a V-shaped groove 52 (see FIG. 5) in its lower surface to allow this air to be bled. The V-shaped groove 52 is so small that there is not leakage of any significant extent during the time that the pressure of the tire is being determined. While it is not a requisite for satisfactory operation that the sealing ring 51 have the V-shaped groove 52 therein, the V-shaped groove 52 permits the piston 32 to return to the position of FIG. 1 without any effort on the part of the user if the pressure of the trapped air is greater than the force of the spring 36.

The support member 14, the body 17, and the plunger 37 may be formed of any suitable material but are preferably formed of a plastic material such as acrylonitrile-butadiene-styrene copolymers or polymers, for example. Two preferred examples of the material of the support member 14, the body 17, and the plunger 37 are the ABS plastics, which are sold under the trade names Cycolac and Tybrene.

By forming the support member 14, the body 17, and the plunger 37 of plastic, the weight of the combined gauge and inflator of the present invention is relatively small. As a result, it does not affect the balance of the tire to which it is attached. Additionally, the use of the plastic substantially reduces the cost.

While the present invention has shown the retaining means for the body 17 to be grooves having retaining portions at their lower ends, it should be understood that any other suitable type of retaining means could be employed. For example, the grooves could be replaced by L-shaped grooves receiving pins. In this arrangement, it would be necessary to only rotate the body 17 slightly and then push down so that there would be no further rotation of the body 17. However, upon the return of the body to the position of FIG. 1, this arrangement would necessitate a spring or other suitable means to urge the pins into the retaining portions of the L-shaped grooves.

While the present invention has shown and described the scale 48 as being on the piston rod 31 and the marker being on the body 17, it should be understood that the body 17 could be formed of a transparent material with the scale thereon and the marker disposed on the piston rod 31.

Furthermore, the support member 14 could be extended upwardly to have a marker thereon for cooperation with the scale on the piston rod 31 if desired. Of course, this also would necessitate the body 17 being transparent.

Additionally, with the support member 14 extended upwardly, the scale could be disposed on the support member 14 and the marker could be on the piston rod 31. Of course, this would necessitate both the body 17 and the support member 14 being transparent.

While the present invention has shown and described the piston 32 as having the sealing ring 35 mounted thereon, it should be understood that sealing means could be mounted on both the body 17 and the piston 32 or only on the body 17. Of course, in either of these arrangements, the sealing means would be arranged so as to not be effective until the body 17 was disposed in the position of FIG. 3.

An advantage of this invention is that the piston seal is effective only when measuring the pressure of the tire whereby the life of the seal is increased and there is no buildup of breakout friction. Another advantage of this invention is that it is relatively inexpensive. A further advantage of this invention is that a single device permits the pressure of the tire to be determined and the tire to be inflated.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What we claim is:

1. A pressure gauge for indicating the fluid pressure in an enclosed chamber including:
   a support member for connection to the enclosed chamber;
   a body supported by said support member for movement relative thereto between first and second positions;
   means to open a valve that controls communication to the enclosed chamber, said valve opening means being unconnected to said body and supported by said support member, said valve opening means being movable independently of said body;
   means urging said valve opening means to an inactive position, said urging means being supported by said support member;
   said body overcoming said urging means to move said valve opening means to its active position when said body is moved from its first position to its second position;
   means supported by said body and responsive to the fluid pressure of the enclosed chamber when said valve opening means is in its active position and said body is in its second position;
   and at least one of said responsive means and said body having means to indicate the pressure of the fluid within the enclosed chamber in accordance with the position of said responsive means in said body.

2. The pressure gauge according to claim 1 in which:
   said body has a passage extending therethrough and providing communication from exterior of said body to the enclosed chamber when said valve-opening means is in its active position and said body is in its first position;
   said responsive means is slidably disposed in said body passage;
   and one of said responsive means and said body has sealing means to seal said passage only when said body is in its second position.

3. A pressure gauge for indicating the fluid pressure in an enclosed chamber including
   a support member for connection to the enclosed chamber;
   a body supported by said support member for movement relative thereto between first and second positions;
   said body opening a valve that controls communication to the enclosed chamber, said body opening the valve when said body is in its second position;
   said body having a passage extending therethrough to provide communication from exterior of said body to the enclosed chamber when the valve is open and said body is in its first position;
   means slidably disposed in said body passage and responsive to the fluid pressure in the enclosed chamber when said body is in its second position;
   at least one of said slidably disposed means and said body having means to seal said body passage only when said body is in its second position to prevent flow of fluid pressure from the enclosed chamber through said passage to exterior of said body;
   and means to indicate the fluid pressure in the enclosed chamber in accordance with the position of said slidably disposed means in said body.

4. The pressure gauge according to claim 3 in which:
   said sealing means is mounted only on said slidably disposed means;
   and said sealing means is disposed exterior of said passage when said body is in its first position.

5. The pressure gauge according to claim 3 in which:
   said indicating means includes:
      a scale on one of said slidably disposed means and said body;
      and marking means on the other of said slidably disposed means and said body for cooperation with said scale.

6. A pressure gauge according to claim 3 in which said sealing means is mounted only on said slidably disposed means.

7. A combined tire gauge and inflator for mounting on a tire including:
   a support member for mounting on a tire stem;
   a body supported by said support member for movement between first and second positions;
   said body and said support member cooperating to form a chamber therebetween when said body is in its first position;
   said body having a passage extending therethrough to provide communication from exterior of said body to the chamber;
   means to open a valve in the tire stem, said valve opening means being supported by said support member;
   means urging said valve opening means to an inactive position;
   means slidably disposed in said passage in said body and in engagement with said valve opening means when said body is in its first position;
   said slidably disposed means being responsive to the air pressure in the tire when said body is moved to its second position, said body moving said valve-opening means to a valve-opening position to open the valve in the tire stem when said body is in its second position;
   at least one of said slidably disposed means and said body having sealing means to prevent flow of air through said passage when said body is in its second position, said sealing means being ineffective when said body is in its first position;
   means to indicate the air pressure of the tire in accordance with the position of said slidably disposed means when said body is in its second position;
   and said slidably disposed means being movable by an air chuck or the like to move said valve-opening means to a valve-opening position when said body is in its first position to allow air to be supplied from the air chuck through said body passage to the chamber and from the chamber to the tire.

8. The combined tire gauge and inflator according to claim 7 including means to lock said body in its first position.

9. The combined tire gauge and inflator according to claim 7 in which said indicating means has means on at least one of said slidably disposed means and said body.

10. The combined tire gauge and inflator according to claim 7 including means to form a seal between said body and said support member.

11. The combined tire gauge and inflator according to claim 7 in which said sealing means is mounted only on said slidably disposed means.

12. The combined tire gauge and inflator according to claim 11 in which said sealing means is mounted on the portion of said slidably disposed means in the chamber when said body is in its first position.

13. The combined tire gauge and inflator according to claim 12 in which said body is supported by said support member for sliding movement between its first and second positions.

14. The combined tire gauge and inflator according to claim 13 including means to lock said body in its first position.

15. The combined tire gauge and inflator according to claim 7 in which:
   said indicating means includes:
      a scale on one of said slidably disposed means and said body;
      and marking means on the other of said slidably disposed means and said body for cooperation with said scale.

16. The combined tire gauge and inflator according to claim 15 in which:
   said slidably disposed means has said scale thereon;
   and said body has said marking means thereon.

17. The combined tire gauge and inflator according to claim 7 in which said support member has an inner threaded portion for cooperation with the outer threaded portion of the tire stem to mount said support member on the tire stem.

18. The combined tire gauge and inflator according to claim 17 including sealing means carried by said support member to seal said support member at the connection of said threaded portion of said support member with the outer threaded portion of the tire stem.

19. The combined tire gauge and inflator according to claim 7 in which said body is supported by said support member or sliding movement between its first and second positions.

20. The combined tire gauge and inflator according to claim 19 including means to lock said body in its first position.

UNITED STATES PATENT OFFICE
CERTIFICATE OF CORRECTION

Patent No. 3,592,218          Dated July 13, 1971

Inventor(s)    Billy Lynn Guy et al.

It is certified that error appears in the above-identified patent and that said Letters Patent are hereby corrected as shown below:

Column 1, line 4, "9" should read -- a --; line 31, after "tires" insert a period; line 66, "preset" should read -- present --. Column 2, line 65, "buildup" should read -- build-up --; line 65, "breakout" should read -- break out --; line 74, "g0uge" should read -- gauge --. Column 3, line 18, "disposed" should read -- second --; line 23, "more" should read -- move --; lines 23, 24, 35 and 39, cancel the "hyphen (-), each occurrence; line 35, "more" should read -- move --. Column 4, line 63, "baseplate" should read -- base plate --; line 69, "baseplate" should read -- base plate --. Column 5, line 9, "breakout" should read -- break out --; line 10, "buildup" should read -- build-up --; line 11, "boY" should read -- body --; line 53, "baseplate" should read -- base plate --. Column 6, line 75, "buildup" should read -- build-up --. Column 7, line 1, "breakout" should read -- break out --; line 40, cancel the "hyphen (-); line 48, after "including" insert a colon (:). Column 8, lines 28, 29, 40 and 41, cancel the "hyphen (-), each occurrence. Column 10, line 3, "or" should read -- for --.

Signed and sealed this 30th day of May 1972.

(SEAL)
Attest:

EDWARD M. FLETCHER, JR.          ROBERT GOTTSCHALK
Attesting Officer                Commissioner of Patents